(12) United States Patent
Pham et al.

(10) Patent No.: US 10,496,551 B2
(45) Date of Patent: Dec. 3, 2019

(54) METHOD AND SYSTEM FOR LEVERAGING NON-UNIFORM MISS PENALITY IN CACHE REPLACEMENT POLICY TO IMPROVE PROCESSOR PERFORMANCE AND POWER

(71) Applicant: Intel Corporation, Santa Clara, CA (US)

(72) Inventors: Binh Q. Pham, Hillsboro, OR (US); Ren Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 15/636,235

(22) Filed: Jun. 28, 2017

(65) Prior Publication Data

US 2019/0004970 A1    Jan. 3, 2019

(51) Int. Cl.
*G06F 12/12* (2016.01)
*G06F 12/128* (2016.01)
*G06F 12/0897* (2016.01)
*G06F 12/0891* (2016.01)
*G06F 3/06* (2006.01)
*G06F 9/46* (2006.01)

(52) U.S. Cl.
CPC .......... *G06F 12/128* (2013.01); *G06F 3/0611* (2013.01); *G06F 3/0652* (2013.01); *G06F 3/0656* (2013.01); *G06F 3/0673* (2013.01); *G06F 9/46* (2013.01); *G06F 12/0891* (2013.01); *G06F 12/0897* (2013.01); *G06F 2212/1024* (2013.01); *G06F 2212/70* (2013.01)

(58) Field of Classification Search
CPC ............. G06F 12/0811; G06F 12/0891; G06F 12/0897; G06F 12/121; G06F 12/126; G06F 12/127; G06F 12/128; G06F 2212/69; G06F 2212/70
USPC .......................................... 711/133, 134, 159
See application file for complete search history.

(56) References Cited

U.S. PATENT DOCUMENTS

| | | | |
|---|---|---|---|
| 7,502,889 B2* | 3/2009 | Sistla | G06F 12/121 711/128 |
| 2008/0313407 A1* | 12/2008 | Hu | G06F 12/0811 711/133 |
| 2013/0097387 A1* | 4/2013 | Sanchez Martin | G06F 12/0862 711/129 |
| 2017/0293571 A1* | 10/2017 | Al Sheikh | G06F 12/124 |

* cited by examiner

*Primary Examiner* — Gary J Portka
(74) *Attorney, Agent, or Firm* — Nicholson De Vos Webster & Elliott LLP

(57) ABSTRACT

Method, system, and apparatus for leveraging non-uniform miss penalty in cache replacement policy to improve performance and power in a chip multiprocessor platform is described herein. One embodiment of a method includes: determining a first set of cache line candidates for eviction from a first memory in accordance to a cache line replacement policy, the first set comprising a plurality of cache line candidates; determining a second set of cache line candidates from the first set based on replacement penalties associated with each respective cache line candidate in the first set; selecting a target cache line from the second set of cache line candidates; and responsively causing the selected target cache line to be moved from the first memory to a second memory.

23 Claims, 18 Drawing Sheets

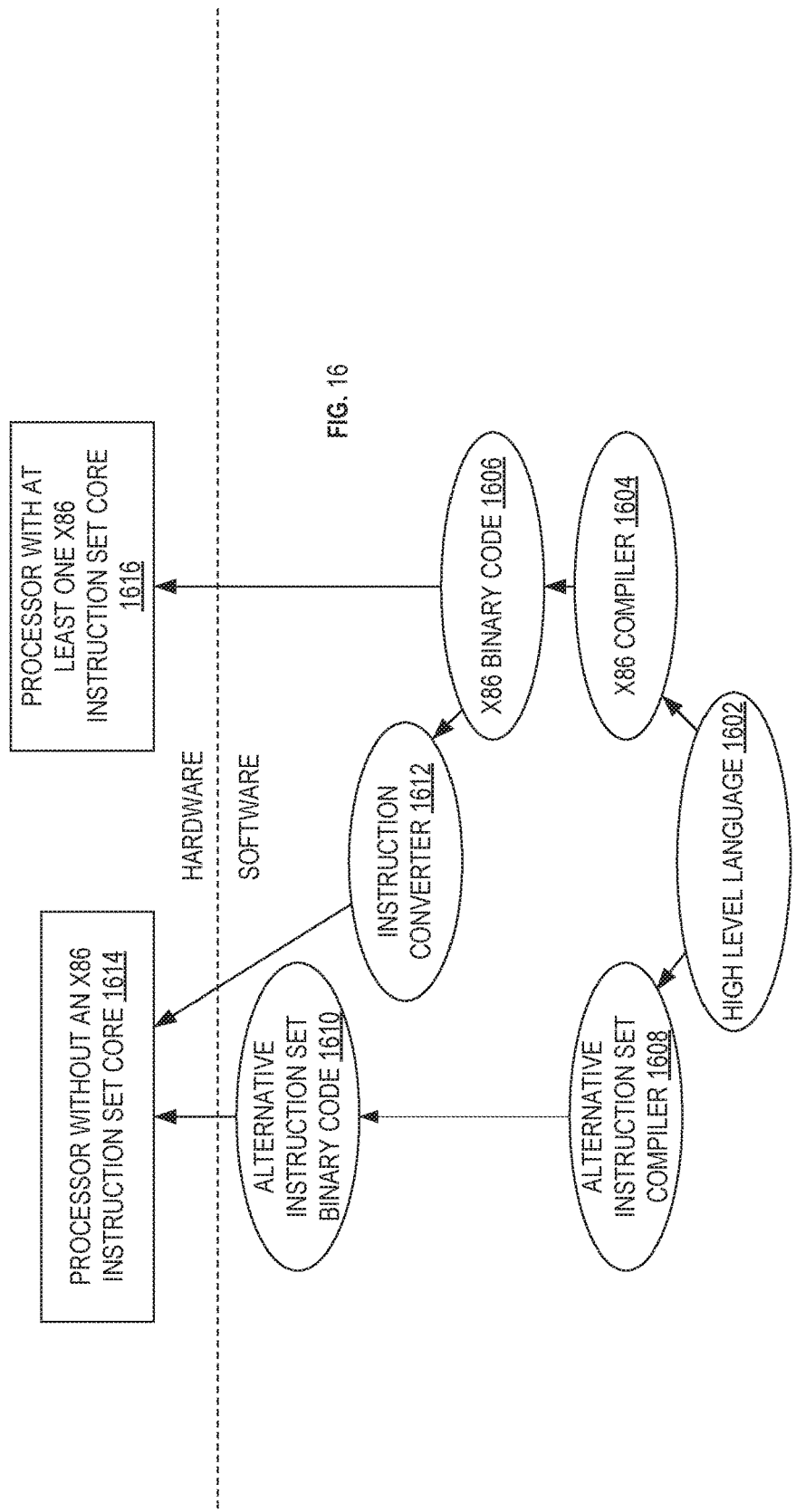

METHOD AND SYSTEM FOR LEVERAGING NON-UNIFORM MISS PENALITY IN CACHE REPLACEMENT POLICY TO IMPROVE PROCESSOR PERFORMANCE AND POWER

BACKGROUND

Field of the Invention

The various embodiments of the invention described herein relate generally to microprocessor cache subsystems in computer systems. and more specifically to cache replacement policies.

Description of the Related Art

High performance caching is critical to system performance as it helps keeping relevant data close to the computing or processing units that need it, which in turn reduces the number for costly (e.g., long-latency) accesses to main memory or lower level caches for fetching missing data. One key aspect in designing a high-performing cache is the choice of a replacement policy. Ideally, a cache line replacement policy should remove and/or replace any cache lines that will not be referenced again in the near future. The Least Recently Used (LRU) cache line replacement policy aims to approximate this by assuming that if a cache line has not been used for a while, it is unlikely to be used again.

The implementation of a perfect LRU policy in hardware, however, is a costly proposition in terms of time and space requirements. For example, a full LRU implementation capable of tracking exactly the age each cache line in the cache requires at least N number of bits, where N=log (cache_associativity). Moreover, these N bits need to be updated each time data in the cache is accessed, which also incurs significant maintenance overhead. Thus, to reduce the number of resources required, some form of a pseudo LRU implementation is often used instead. For instance, some pseudo LRU implementations utilize a fixed-number of bits (e.g., 2-bits) for tracking the cache line age regardless of cache associativity. This not only simplifies the implementation but also reduces the time and space requirements, in exchange for not being able to precisely track each cache line's age. One of the tradeoffs of this simplified approach is that it often resulted in multiple eviction candidates and whichever candidate that happens to be found or scanned first will be evicted. This represents a potential drawback because the selected eviction choice may not always be ideal as 1) the chosen cache line may have better locality than the other candidates, and 2) the chosen cache line may reside in a remote cache slice or distant memory that is more costly to fetch from when it is referenced again.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 16 illustrates a block diagram contrasting the use of a software instruction converter to convert binary instructions in a source instruction set to binary instructions in a target instruction set according to embodiments of the invention.

DETAILED DESCRIPTION

Figure 1:
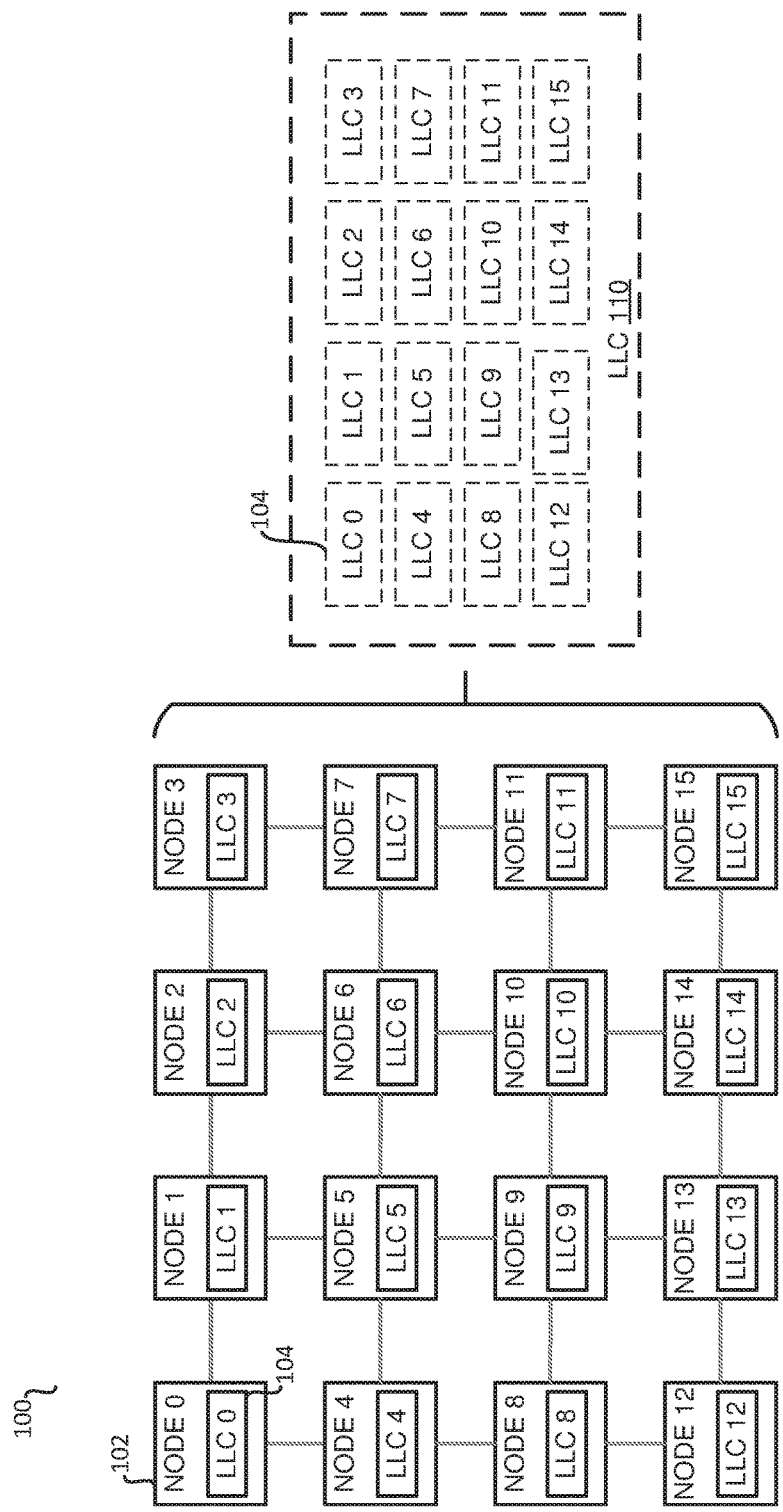
FIG. 1 illustrates an exemplary system platform on which embodiments of the current invention may be implemented.

Embodiments of method, system, and apparatus for leveraging non-uniform miss penalty in cache replacement policy to improve processor performance and power is described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

High performance caching is critical to system performance as it helps keeping relevant data close to the computing or processing units that need it, which in turn reduces the number for costly (e.g., long-latency) accesses to main memory or lower level caches for fetching the required data. One key aspect in designing a high-performing cache is choosing a good cache line (i.e., data) replacement policy. Ideally, a cache line replacement policy should remove and/or replace from the cache any cache lines that are not likely to be referenced again, to free up space for cache lines that are currently being used. The Least Recently Used (LRU) cache line replacement policy aims to approximate this by relying on the assumption that if a cache line has not been used for a while, it is unlikely to be used again. The LRU provides a simple yet effective mechanism for selecting candidates to evict from a cache by tracking when each cache line in the cache was last referenced relative to each other. This is done so by maintaining an "age" for each cache line. The idea is that the cache line with the oldest age is the least recently used cache line in the cache and therefore should be the first one to be replaced by a more recently referenced cache line.

To implement a perfect LRU policy, however, is a costly proposition in terms of space, as well as time, requirements. For example, a full LRU implementation capable of tracking the age of each cache line in the cache requires N number of bits, where N is a function of the associativity or ways of the cache (i.e., N=log(cache_associativity)). Moreover, as these tracking bits need to be updated each time the data in the cache is accessed, significant management overhead is also required. Thus, to reduce implementation cost, some form of a pseudo LRU mechanism is often used instead of a full LRU implementation. For instance, instead of using N bits to track the precise age of each cache line, pseudo LRU implementations typically utilize fewer bits (e.g., 2 or 4-bits) to approximate the relative age between cache lines irrespective of the cache associativity. While these approaches may simplify implementation complexity and thus reduce cost, they do so at the expense of not being able to track precisely the age of each cache line relative to one another. This tradeoff means that under a pseudo LRU policy, often time there are more than one eviction candidate that have the same age. Typically, when this happens, whichever eviction candidate that happens to be found or scanned first will be selected for eviction. Under this approach, however, the selected cache line may not always be the best candidate for eviction as 1) it may have better locality (i.e., higher likelihood of being referenced again) relative to other eviction candidates of the same age; and 2) it may reside in a remote or distant part of the cache or memory which, in the event that it is referenced again, will be more costly to access. Thus, by not always selecting the best eviction candidate, pseudo LRU implementations may, in some situations, cause undesirable performance degradation and power consumption that could and should have been avoided.

Aspects of the present invention address hopes to alleviate these issues by taking into consideration the cache miss penalty associated with each eviction candidate when multiple candidates are generated under a pseudo LRU policy. According to an embodiment, the cache line miss penalty or cache line replacement penalty is defined as the time it takes to fetch a missing cache line from a memory location, such as a lower level cache or the system memory, into a current cache. The current cache may be the MLC or LLC depending on the implementation. According to aspects of the present invention, in situations when multiple eviction candidates are generated by a pseudo LRU policy, instead of just picking the first one that is scanned, the cache line eviction logic in a cache agent or controller takes the non-uniform cache miss penalty into consideration and chooses the cache line with the smallest cache miss penalty as the eviction victim. The reasoning here is that cache lines with higher miss penalties should be retained in the cache over cache lines with lower miss penalties because cache lines with higher miss penalties cost more to be fetched back into the cache. In situations where there are multiple eviction candidates remaining even after taking into account their associated cache miss penalties, an eviction candidate may be selected out of the remaining candidates at random, in accordance with an embodiment.

The motivation for the present invention is based on the non-uniform nature of cache and/or memory accesses that is a signature of modern computing systems. Data access, even to the same level of memory in a memory hierarchy, can vary significantly depending on the location and/or type of the memory being accessed. While the following examples and embodiments focus on last level cache (LLC) and non-uniform memory in chip multi-processor (CMP) platforms, aspects of the present invention are applicable to many other usage scenarios wherein differences in memory access costs can be leveraged.

FIG. 1 illustrates an exemplary system platform on which embodiments of the current invention may be implemented. In modern CMP designs that utilize multi-node or multi-tile configurations, multiple nodes (i.e., cores) are connected to one another through a network of interconnects. Moreover, in at least some of these CMP designs, the LLC is physically distributed and logically shared between the multiple nodes. For example, in FIG. 1, multi-node CMP 100 includes 16 nodes (node 0-node 15) arranged in a tile/mesh configuration. Each of the 16 nodes include a slice/portion of the LLC (LLC 0-LLC 15). Together, the different slices LLC (LLC 0-LLC 15) form a logical LLC 110 that is shared among 16 nodes, or the processor cores within these nodes.

Figure 2A:
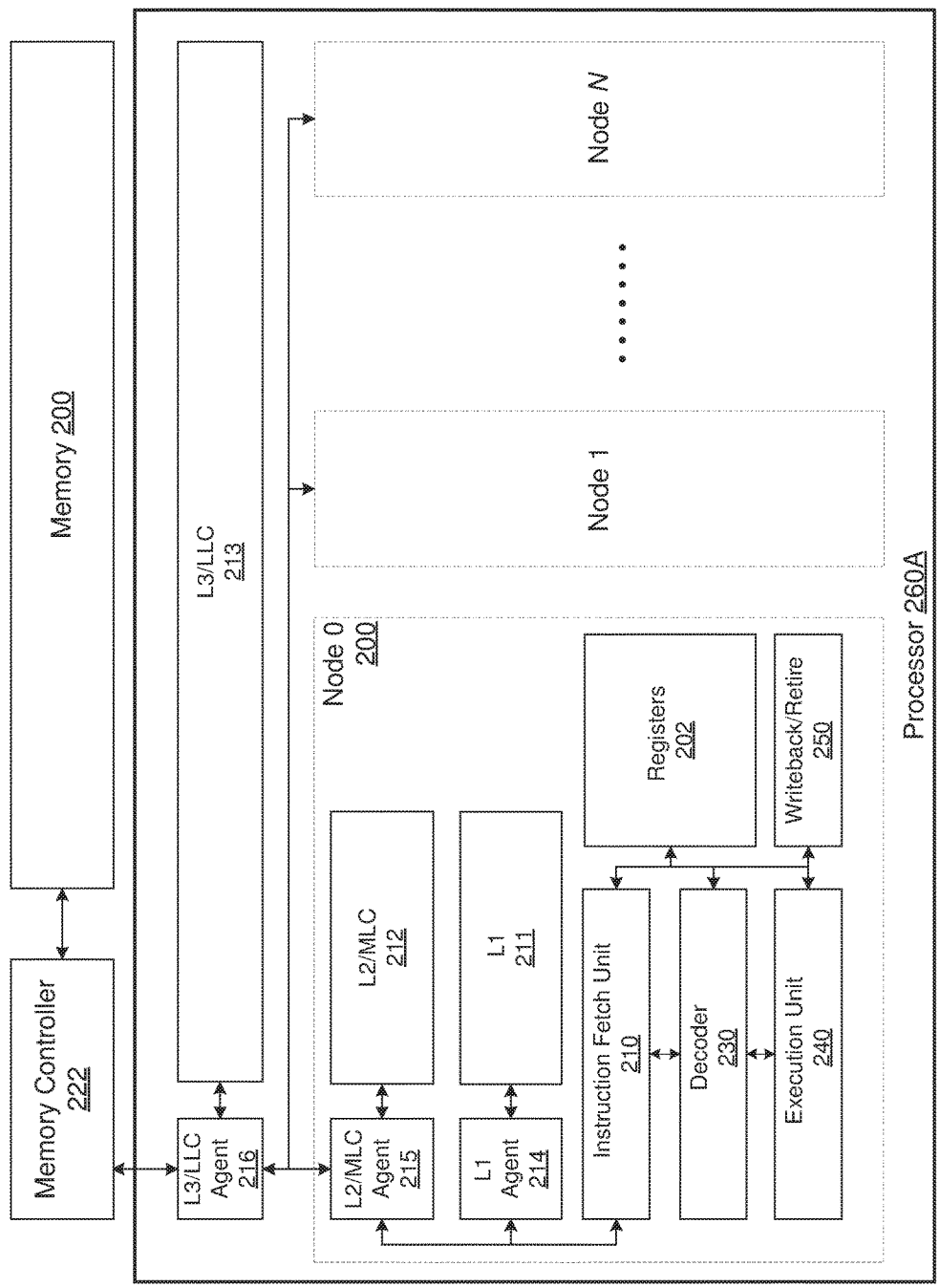
FIG. 2A-2B illustrate embodiments of the nodes in detail.
Figure 2B:
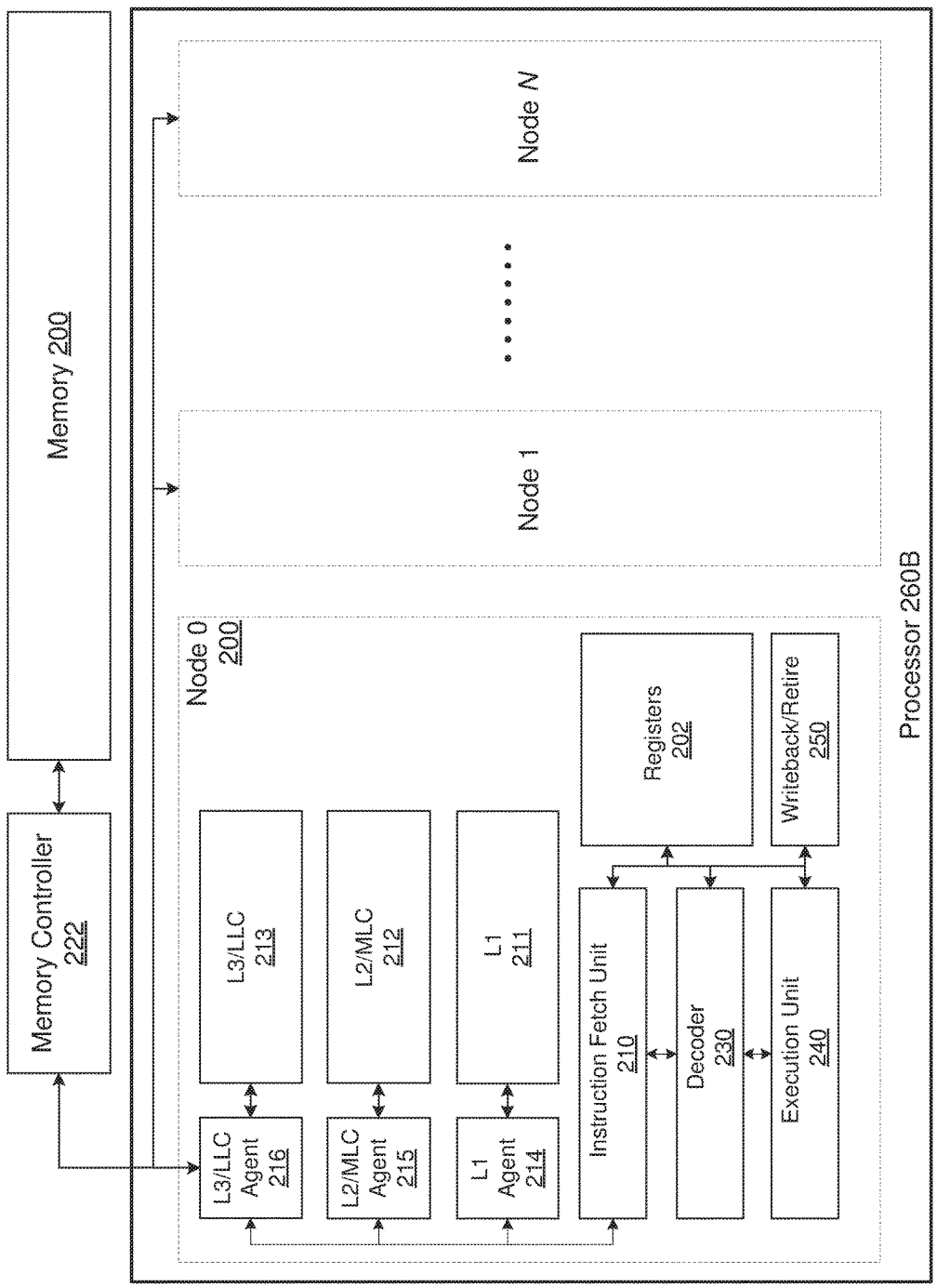

FIGS. 2A-2B illustrate embodiments of the nodes in detail. According to an embodiment, one or more nodes may reside in a CMP, such as processors 260A and 260B illustrated in FIGS. 2A and 2B, respectively. In some embodiments, each node constitutes, or includes, a processor core (core). The details of a single node (i.e., node 0) are illustrated in FIGS. 2A-2B for simplicity. It will be understood, however, that each node may have the same set of logic, components, circuitry, and/or configuration as node 0. For example, each node may include a set of registers 202, a level 1 cache (L1) 211, and a L2 (L2) or mid-level cache (MLC) 212. In some embodiments, as shown in FIG. 2A, processor 260A further includes a level 3 (L3) cache or LLC 213 that is communicatively coupled to, and shared by, all the nodes. In other embodiments, such as the one shown in FIG. 2B, the L3/LLC 213 is physically distributed and logically shared among the nodes. In other words, each node includes a portion of the L3/LLC 213. Each of L1, L2/MLC, and L3/LLC caches, according to an embodiment, is managed by a respective cache agent or controller (214-216) and usable for caching instructions and data according to a specified cache management policy. In at least some embodiments, the cache management policy further includes a cache eviction/replacement policy. The instructions and data stored within the various processor caches are managed at the granularity of cache lines which may be a fixed size (e.g., 64, 128, 512 Bytes in length). Each node of the exemplary embodiments further includes an instruction fetch unit 210 for fetching instructions from main memory 200 via memory controller 2 222 and/or from the shared LLC 213 via L3/LLC agent 216; a decode unit 230 for decoding the instructions (e.g., decoding program instructions into micro-operatons or "uops"); an execution unit 240 for executing the decoded instructions; and a writeback unit 250 for retiring the instructions and writing back the results.

As instructions are fetched, decoded, executed and retired, data is stored into the various caches. When a cache becomes full, the associated cache agent or controller frees up space by evicting existing cache lines from the cache in accordance to the cache eviction/replacement policy. When a cache line is evicted, it is stored into the next lower-level cache, if space is available, or alternatively, to the system memory. For example, in the case of the MLC, cache lines that are evicted from the MLC are stored into the LLC. If the LLC is a distributed LLC, such as the one illustrated in FIG. 1, a cache line evicted from the MLC of one of the nodes (e.g., node 0 102) may be stored into the LLC slice of the same node (LLC 0 104) or a different node (LLC 1-LLC15). According to an embodiment, the address of the evicted cache line is used to determine the LLC slice to which the evicted cache line will be stored. In one embodiment, each cache line address is mapped to a LLC slice via a hash function. In other embodiments, direct/indirect mapping table(s) may be used. This variation in the destination of the evicted cache lines exposes a non-uniform miss penalty in the event that the evicted cache lines are fetched again from their respective LLC slices.

Figure 3A:
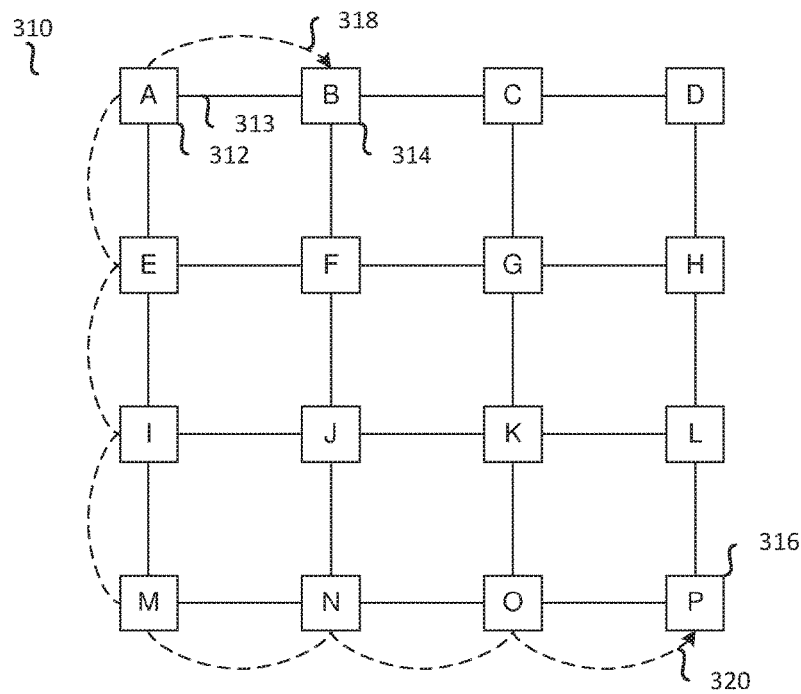
FIG. 3A-3C illustrates exemplary network arrangements of the nodes in a chip multi-processor (CMP)

Referring to FIG. 1, nodes 0-15 are interconnected via a mesh-type network. As inherent in most network architectures, node-to-node communications can vary greatly both in terms of cost and speed, depending on which of the nodes are involved in the communication. For example, in some scenarios, the connections between some nodes may be faster and/or more efficient than the connections between other nodes. In other scenarios, even with all things being equal, communications between two nodes that are physically close together will tend to incur less latency and uses less power than the communications between two nodes that are far apart. For example, FIG. 3A illustrates a 16-node (i.e., nodes A-P) processor utilizing a mesh-type interconnect 310 similar to that of CMP platform 100 in FIG. 1. With the costs (e.g., power consumption and access latency) associated with each inter-node connection, or "hop," (e.g., 313) being relatively equal, communications between adjacent nodes (e.g., node A 312 and node B 314) will almost always incur a lower cost than communications between nodes that are farther apart (e.g., node A 312 and node P 316). Specifically, with respect to FIG. 3A, communications between node A 312 and B 314 will incur 1 hop 318 worth of cost while communications between node A 312 and P 316 would incur 6 hops 320.

Figure 3B:
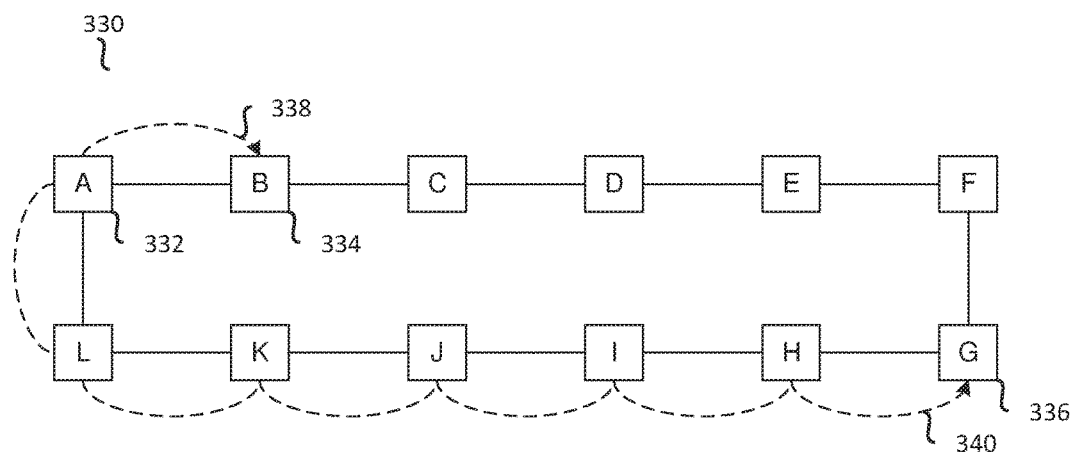
Figure 3C:
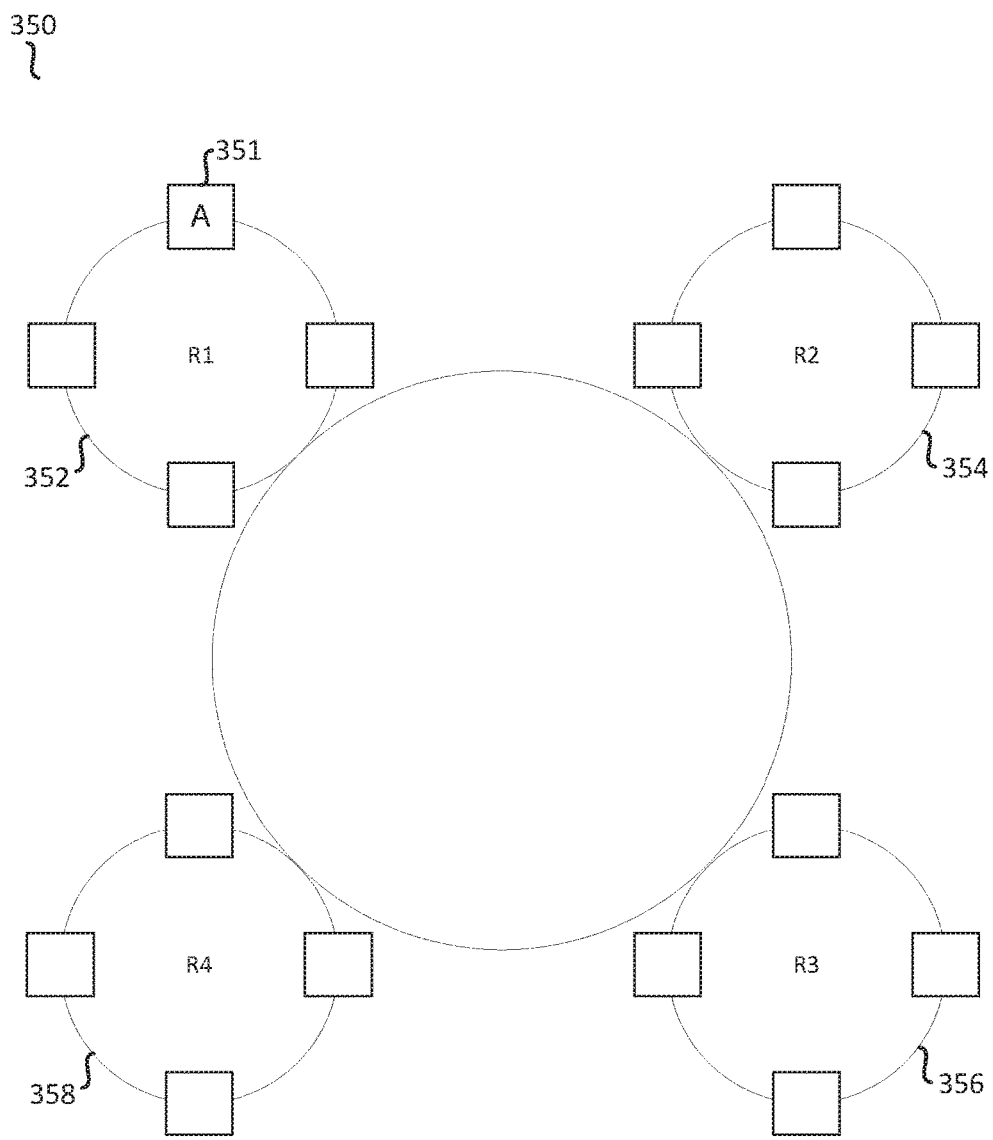

Similar communication disparities exist in other types of network configurations, such as the ring 330 and the hierarchical ring 350 illustrated in FIGS. 3B and 3C, respectively. In FIG. 3B, communications between node A 332 and B 334 will incur 1 hop 338 worth of cost while communications between node A and node P 336 will require 6 hops 340 worth. In more complicated configurations such as hierarchical ring of FIG. 3C, costs for node A to communicate with other nodes within the same local ring R1 352 will tend to be lower than the costs for node A to communicate with nodes in remote rings R2 354, R3 356, and R4 358.

As described above, the respective costs for accessing different nodes are typically not uniform. Thus, fetching a cache line from a remote node tend to result in higher costs than fetching it form a local node. In terms of latencies, the cost may range from a minimum of 1 cycle per hop for a simple ring configuration to upwards of 5 cycles per hop for more complicated on-die router designs. For multi-node CMP designs, the extra latency between accessing a far node vs. a near node can reach 10 to ~50 cycles. This is significant when considering that the latency for core to LLC access is typically on the order of tens of cycles. Moreover, besides significant increases to access latency, frequent access to remote nodes also create interconnect congestion and higher power consumption.

Figure 4:
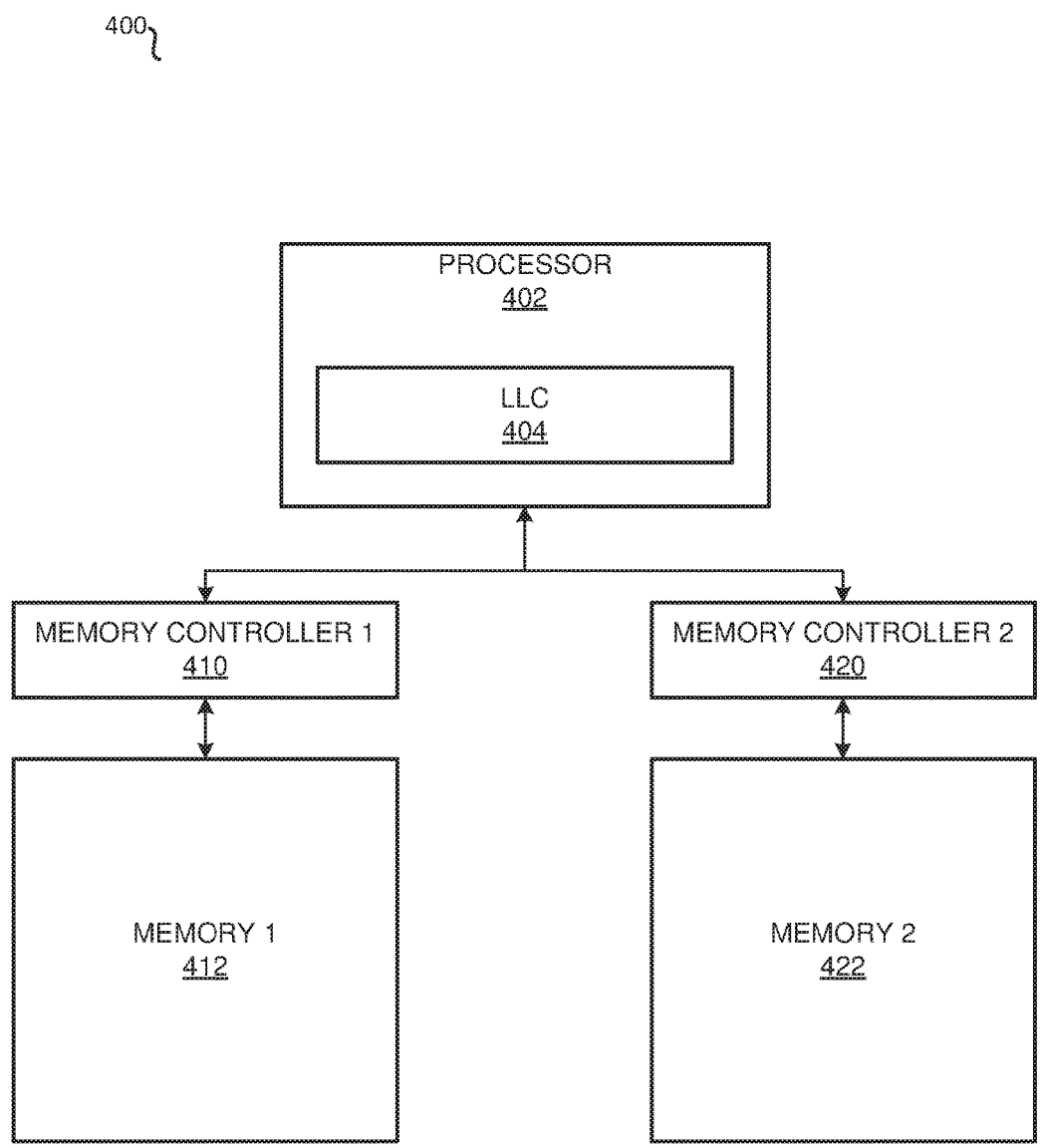
FIG. 4 illustrates a hardware platform on which embodiments of the present invention may be implemented between the LLC and system memory.

The difference in cache miss penalty is even more significant when system memory is accessed after a miss in the LLC. When a cache line request is missed in the LLC, the requested cache line is fetched from system memory (e.g., dynamic random access memory (DRAM)). A typical access to local DRAM takes roughly 150 cycles while remote DRAM access can take roughly 250 cycles. With a 100-cycle difference in play between local or remote DRAM accesses, it is desirable to minimize the accesses to remote DRAMs. FIG. 4 illustrates a hardware platform on which embodiments of the present invention may be implemented between the LLC and system memory. In FIG. 4, processor 402, which includes an LLC 404, is communicatively coupled to memory 1 412 and memory 2 422 via memory controllers 410 and 420, respectively. According to an embodiment, the LLC 404 may be a single physical cache, or alternatively, a logical cache that is physically distributed among one or more cores (not shown) of processor 402. In an embodiment, memories 412 and 422 are dynamic random access memories (DRAMs) that form the system memory of platform 400 or part thereof. When a cache line is evicted from LLC 404, it may be stored to either memory 1 412 or memory 2 422. In one embodiment, the cache line address determines the memory to which the cache line is to be stored. Each cache line address may be mapped to one of the memories via a hash function or a mapping table. In some embodiments, memory 1 is a local memory while memory 2 is a remote memory, or vice versa. In other embodiments, memory 1 is a fast memory while memory 2 is a slow memory. In any case, accesses costs (e.g., latency and/or power consumption) to memories 1 and 2 are not equal. Thus, depending on which memory each evicted cache line is mapped, the miss or replacement penalty associated with each evicted cache line will vary.

Figure 5:
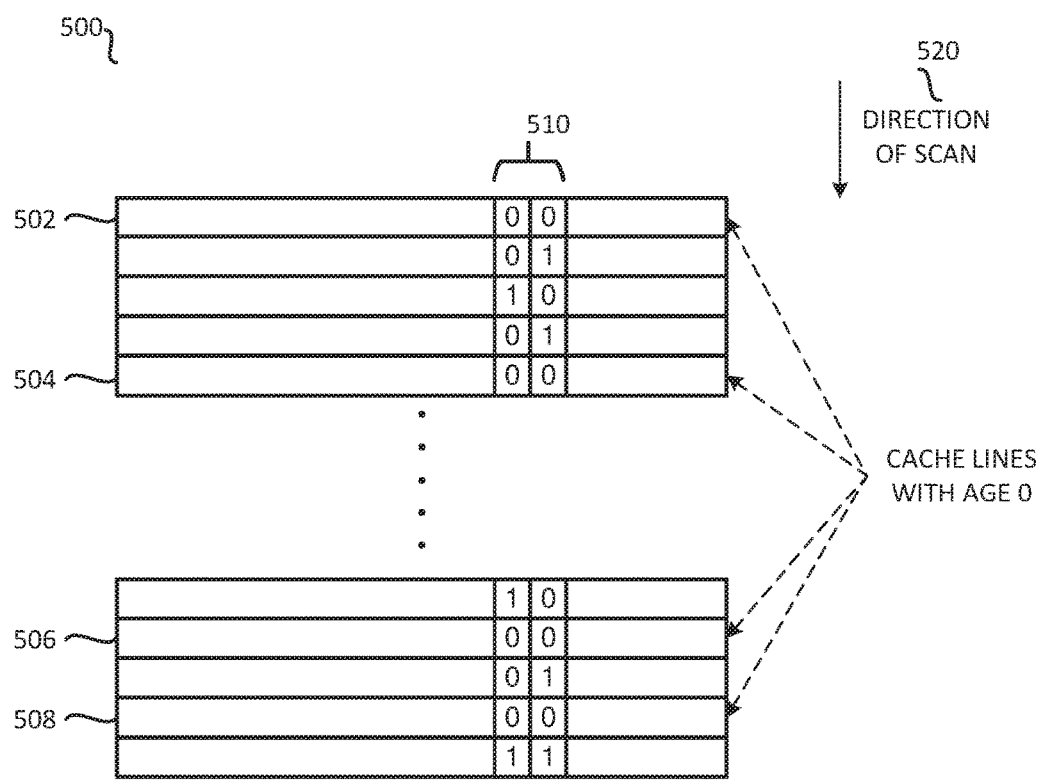
FIG. 5 illustrates an exemplary cache in which a QLRU policy is implemented, according to an embodiment.

As mentioned above, an aspect of the present invention is to choose from multiple potential cache line eviction candidates, as determined by a pseudo LRU cache replacement policy, the cache line candidate with the smallest/lowest miss or replacement penalty. An example of the pseudo LRU cache replacement policy is the quad-age LRU (QLRU) policy. FIG. 5 illustrates an exemplary cache in which a QLRU policy is implemented, according to an embodiment. Under the QLRU policy, 2-bits (510) in each cache line (e.g., 502-508) of cache 500 are used to track the age of the cache line. Thus, each cache line is associated with 1 of 4 possible ages ranging from 0 to 3, with age 3 being the newest or youngest and age 0 being the oldest. According to an implementation of QLRU, the age of a cache line brought into the cache based on a cache miss is set to age 2 and incremented to age 3 on a hit. In contrast, a cache line that is brought into the cache responsive to a prefetch request may be set to age 3. In any event, under a pseudo LRU cache replacement policy, multiple cache lines may be associated with the same oldest age. For example, as shown in FIG. 5, cache lines 502, 504, 506, and 508 are all of age 0 and thus are all candidates for eviction. According to the direction of scan 520, cache line 502 is the first to be scanned and will be selected for eviction regardless of its locality and/or associated miss penalty with respect to cache lines 504, 506, and 520 that are of the same age. In contrast, according to embodiments of the present invention, instead of just selecting the first scanned cache line (i.e., 502), all cache lines with age 0 will be considered. Specifically, among these cache lines, the one with the lowest miss penalty will be selected for eviction.

Figure 6:
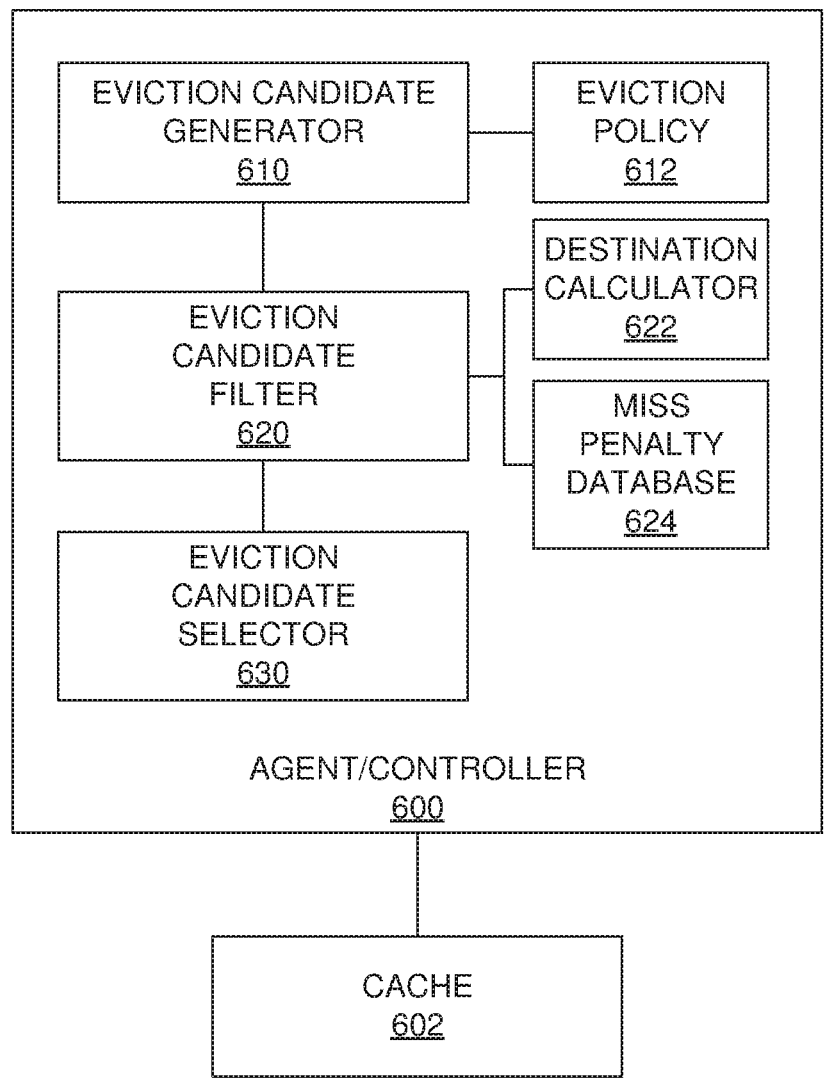
FIG. 6 illustrates an embodiment of the agent/controller capable of performing cache replacement or eviction based on non-uniform cache miss penalty.

FIG. 6 illustrates an embodiment of the agent/controller capable of performing cache replacement or eviction based on non-uniform cache miss penalty. The agent/controller 600 may be implemented as any of the L1, L2/MLC, and L3/LLC agents 214-216 or the memory controller illustrated in FIGS. 2A and 2B. The agent 600 includes eviction candidate generator 610, eviction policy 612, eviction candidate filter 620, destination calculator 622, miss penalty database 624, and eviction candidate selector 630. While these components are shown as part of the agent/controller 600, they may be implemented as additional units separate from the agent/controller 600.

According to an embodiment, upon an indication that a cache line needs to be evicted from the cache 602 to free up space for storing new incoming cache lines, the eviction candidate generator 610 responsively generates a list of one or more eviction candidates to be evicted from the cache 602. According to an embodiment, the eviction candidates are generated based on the eviction policy 612. If the eviction policy 612 is a perfect LRU policy, then the list of eviction candidates generated by the eviction generator 610 will contain only one eviction candidate, which is the least recently used or the oldest cache line in cache 602. On the other hand, as described above, if the eviction policy 612 is a pseudo LRU policy in accordance to embodiments of the present invention, then the generated list may contain one or more eviction candidates.

The list of eviction candidates generated by the eviction candidate generator 610 based on eviction policy 612 is then passed through the eviction candidate filter 620. If the list contains only one eviction candidate, no further filtering or consideration is required. In this case, the eviction candidate is simply selected by the eviction candidate selector 630 to be evicted from cache 602. If the list contains more than one eviction candidate, a destination calculator 622 that is coupled to, or as part of, the eviction candidate filter 620 determines the destination for each of the eviction candidates in the list. According to some embodiments, the destination is a memory location, such as a cache (e.g., LLC) or system memory to which an evicted candidate is to be stored should it be evicted from cache 602. There may be many methods for determining the destination of a cache line. In at least one embodiment, the destination of a cache line is determined by performing a hash of the cache line address. In another embodiment, the destination is determined based on one or more mapping tables that directly or indirectly maps each cache line address to a destination memory location. In addition to a destination calculator 622, the eviction candidate filter 620 further includes, or is coupled to, a miss penalty database 624. In accordance to an embodiment, the miss penalty database 624 stores, and provides to the eviction candidate filter 620, the cost associated with accessing each of the possible destination memory locations, such as access latency, power consumption, connection speed, destination distance, etc. Based on the destination and associated cost for each destination, the eviction candidate filter 620 can determine the miss penalty associated with each eviction candidate generated by the eviction candidate generator 610. The eviction candidate filter 620 then filters the list and keeps only the eviction candidates with the lowest or the smallest miss penalty. Next, the eviction candidate selector 630 selects from the filtered list an eviction candidate for eviction. If the filtered list contains only one eviction candidate, then that eviction candidate is selected for eviction. If there are more than one eviction candidate in the filtered list, according to an embodiment, the eviction candidate selector 630 selects an eviction candidate from the filtered list. The eviction candidate may be selected at random, such as using a random number generator, or in accordance to other selection policies.

Figure 7:
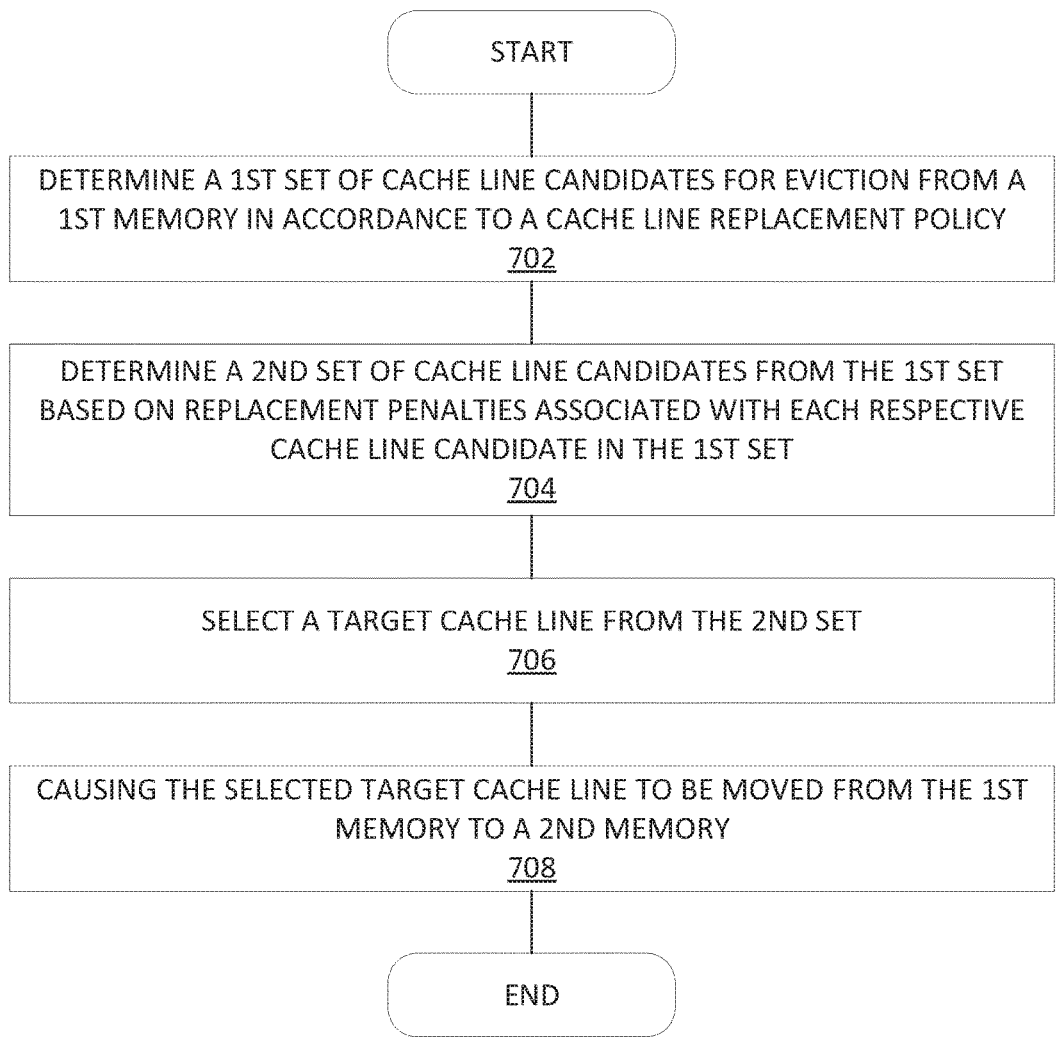
FIG. 7 illustrate an embodiment of a method for determining a cache line to be evicted.

FIG. 7 illustrates an embodiment of a method for determining a cache line to be evicted. The method in FIG. 7, as well as other methods described below, may be implemented in a memory controller or agent, such as agent/controller 600 of FIG. 6. At block 702, a first set of cache line candidates for eviction from a first memory is determined in accordance to a cache line replacement or eviction policy. This, for example, may be performed by the eviction candidate generator 610 of FIG. 6. The first memory location may be a mid-level cache (MLC) or a last level cache (LLC). In at least one embodiment, the cache line replacement policy is any policy that may generate more than one cache line candidate for eviction. The cache line replacement policy may be any pseudo least recently used (pLRU) policy such as a quad-age LRU.

At block 704, a second set of cache line candidates for eviction is determined from the first set of cache line candidates based on the miss or replacement penalties associated with each cache line candidate in the first set. In one embodiment, this is performed by the eviction candidate filter 620 of FIG. 6. The miss penalty may be the cost associated with replacing an evicted cache line should it be referenced again after eviction. The cost may be based on access latency, power consumption, connection speed, destination distance, etc., or a combination thereof. According to some embodiments, the miss penalty for each cache line is determined based on determining its destination location should it be evicted and calculating the cost associated with accessing the destination location. Cache line candidates in the first set with the lowest or smallest replacement candidate are selected for the second set.

In one embodiment, the cache line miss or replacement penalty for each cache line is determined once and stored in the cache line. For instance, according to an embodiment, one bit in each cache line is used to track the relative distance between the cache line's current location (e.g., MLC) and its destination (e.g., one of the LLCs in a distributed LLC), which may approximate the miss penalty. A set bit may indicate that the destination is near (e.g., LLCNear) and an unset bit may indicate that the destination is far (e.g., LLCFar). In other embodiments, additional bits may be used to provide more detailed information on the miss or replacement penalty associated with the cache line. The determination of the miss or replacement penalty may be performed when the cache line is stored into the cache or may be performed at run time such as during the determination of eviction candidates in block 702 or 704.

At block 706, a target cache line is selected from the second set of cache line candidates for eviction. If the second set contains only one cache line candidate, that cache line candidate is selected for eviction. If the second set contains more than one cache line candidate, then one is selected based on a predetermined policy. The predetermined policy may be select the first candidate, last candidate, or a random candidate, from the second set of cache line candidates. At block 708, the selected cache line is evicted, such that it is moved from the first memory to a second memory. In one embodiment, the first memory is a MLC and the second memory is one of the distributed LLCs. In another embodiment, the first memory is an LLC and the second memory is the system memory (e.g., DRAM).

Figure 8:
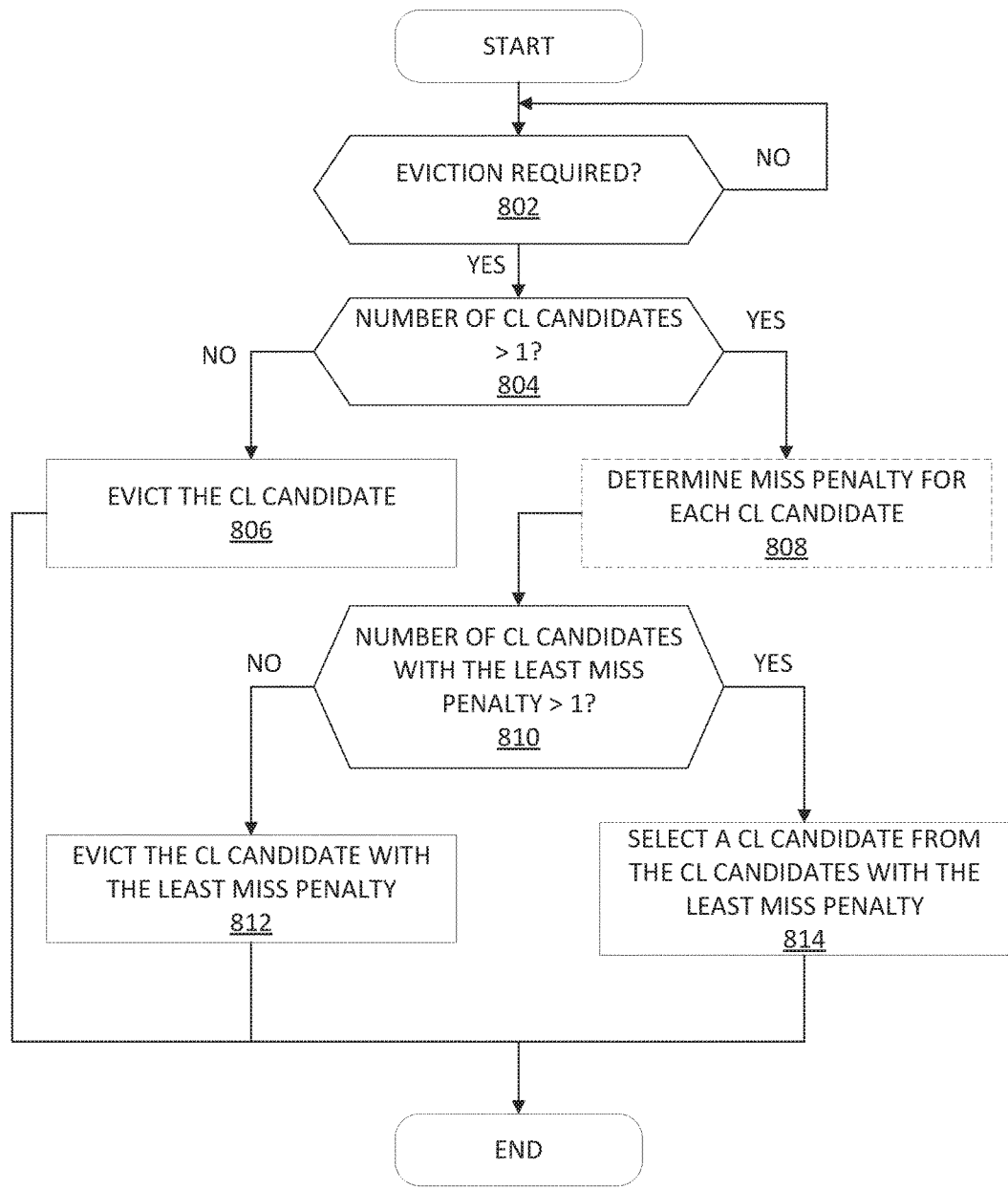
FIG. 8 is a flow diagram illustrating the logic and operations for selecting a cache line for eviction in accordance to an embodiment.

FIG. 8 is a flow diagram illustrating the logic and operations for selecting a cache line for eviction in accordance to an embodiment of the present invention. At block 802, a determination is made on whether a cache line (CL) should be evicted from a cache to free up space in the cache. This may be based on receiving a request to store a cache line in the cache when the cache is already full. If a cache line eviction is not required, the process ends. If eviction is required, a set of cache line candidates for eviction is determined, based on a cache line eviction/replacement policy, such as LRU, pLRU, etc. At block 804, a determination is made on whether the set of cache line candidates for eviction contains more than one cache line candidate. If the set contains only one cache line candidate, that cache line candidate is evicted at block 806. On the other hand, if there are more than one cache line candidate in the set, then the miss or replacement penalty for each cache line candidate in the set is determined at block 808. As described above, determining the miss or replacement penalty may include first determining the respective destination for each cache line candidate in the set based on the cache line address through a hash function or mapping table, and then responsively determining the cost associated with accessing the destination for each cache line candidate. Block 808 is enclosed by dash lines because in some embodiments, the determination of miss penalty takes place when the cache lines were first stored into the cache and the determined miss penalty is stored within the cache lines. According to the embodiment, since this determination applies to the eviction flow and is off the critical path, it has minimal effect on overall system performance. At block 810, a determination is made on whether there are more than one cache line candidates with the smallest or lowest miss penalty. If there is only one cache line candidate with the smallest or lowest miss penalty, that cache line candidate is selected for eviction at block 812. If there are more than one cache line candidate with the smallest or lowest miss penalty, one is selected from these cache line candidates at block 814, such as selecting the cache line candidate with the lowest or highest cache line address, selecting the first or the last cache line candidate, or selecting one at random.

Figure 9:
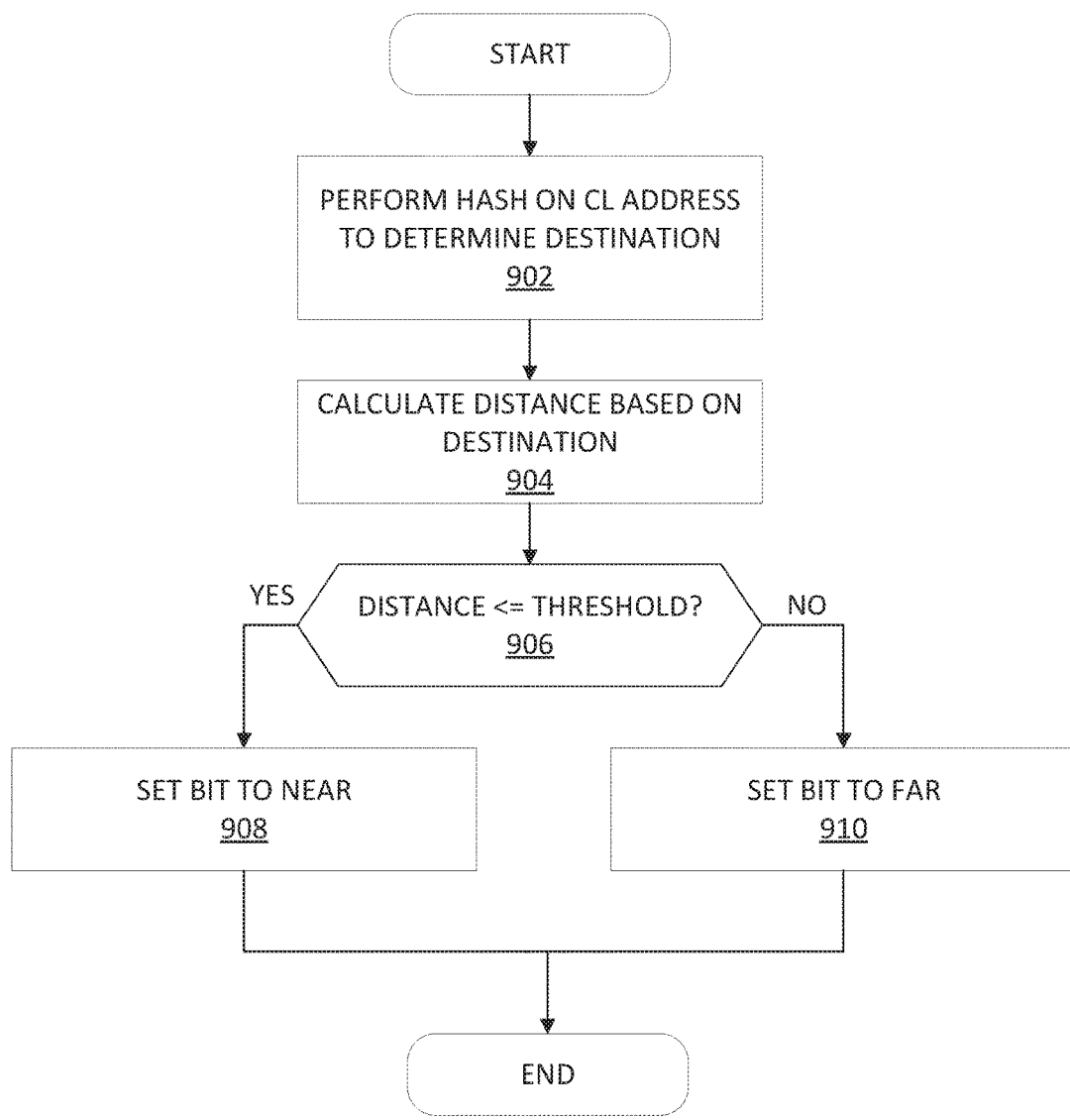
FIG. 9 is a flow diagram illustrating the logic and operations for setting bit(s) in a cache line to indicate the miss penalty in accordance to an embodiment.

FIG. 9 is a flow diagram illustrating the logic and operations for setting bit(s) in a cache line to indicate the miss penalty in accordance to an embodiment of the present invention. According to the embodiment, miss penalty is based on the distance between the cache where the cache line currently resides and a destination, which may be one of the LLCs in a distributed LLC or a particular DRAM in the system memory. At block 902, a destination is determined from the address of the cache line. A hash may be performed on the cache line address to obtain a destination. At block 904, the distance between the current cache and the destination is calculated. Alternatively, or in addition to, the distance may be obtained from a table containing pre-calculated distances between the current cache and various destinations. At block 906, a determination is made between the distance between the current cache and the destination and a predetermined threshold. According to an embodiment, if the distance is less than or equal to the predetermined threshold, a bit in the cache line may be set to indicate that the destination is near the current cache (e.g., LLCNear) at block 908. On the other hand, if the distance is greater than the predetermined threshold, a bit in the cache line is cleared to indicate that the distance between the current cache and the destination is far (e.g., LLCFar). While one bit is described here, additional bits may be used to provide more detailed information.

An example of the present invention is a method for selecting a cache line for eviction, the method includes: determining a first set of cache line candidates for eviction from a first memory in accordance to a cache line replacement policy, the first set comprising a plurality of cache line candidates; determining a second set of cache line candidates from the first set based on replacement penalties associated with each respective cache line candidate in the first set; selecting a target cache line from the second set of cache line candidates; and responsively causing the selected target cache line to be moved from the first memory to a second memory. The cache line replacement policy may be a pseudo least recently used (pLRU) policy. The replacement penalty associated with a given cache line candidate may include an amount of time required to access the given cache line candidate from the second memory. Accessing the given cache line candidate from the second memory may include fetching a copy of the given cache line candidate from the second memory into the first memory. The second set of cache line candidates may include one or more cache line candidates each associated with a lowest replacement penalty. Determining a second set of cache line candidates from the first set may further include: determining a destination for each of the cache line candidates in the first set; determining a replacement penalty for each of the cache line candidates in the first set based on each cache line candidate's determined destination; and selecting, from the first set, one or more cache line candidates associated with a lowest replacement penalty. Determining the destination for each of the cache line candidates in the first set may include executing an address hash on respective cache line addresses of the cache line candidates in the first set. The target cache line may be randomly selected from the second set of cache line candidates when the second set of cache line candidates comprises more than one cache line candidate. The first memory may be a mid-level cache (MLC) and the second memory may be a last-level cache (LLC) that is logically shared and physically distributed between a plurality of hardware processor cores. Alternatively, the first memory may be a last-level cache (LLC) and the second memory may be a system memory comprising multiple dynamic random access memory (DRAM) units with varying access latencies to the first memory.

Another example of the present invention is a system that includes a first memory for storing a plurality of cache lines; a second memory communicatively coupled to the first memory; an eviction candidate generator to determine a first set of cache line candidates for eviction from the first memory in accordance to a cache line replacement policy, the first set comprising a plurality of cache line candidates; an eviction candidate filter to determine a second set of cache line candidates from the first set of cache line candidates based on respective replacement penalties associated with each cache line candidate in the first set of cache line candidates; and an eviction candidate selector to select a target cache line from the second set of cache line candidates and responsively cause the selected target cache line to be moved from the first memory to the second memory. The cache line replacement policy may be a pseudo least recently used (pLRU) policy. The replacement penalty associated with a given cache line candidate may include an amount of time required to access the given cache line candidate from the second memory. Accessing the given cache line candidate from the second memory may include fetching a copy of the given cache line candidate from the second memory into the first memory. The second set of cache line candidates may include one or more cache line candidates associated with a lowest replacement penalty. The eviction candidate filter may further include: a destination calculator for determining a destination for each of the cache line candidates in the first set; a miss penalty database for determining a replacement penalty for each of the cache line candidates in the first set based on each cache line candidate's determined destination, such that the eviction candidate filter is to select, from the first set, one or more cache line candidates associated with a lowest replacement penalty. The destination calculator may determine the destination for each of the cache line candidates in the first set by executing an address hash on respective cache line addresses of the cache line candidates in the first set. The eviction candidate selector may randomly select the target cache line from the second set of cache line candidates when the second set of cache line candidates comprises more than one cache line candidate. The system may further include a plurality of hardware processor cores, wherein the first memory is a mid-level cache (MLC) of one of the plurality of hardware processor cores and the second memory is a last-level cache (LLC) that is logically shared and physically distributed between the plurality of hardware processor cores. Alternatively, the first memory may be a last-level cache (LLC) and the second memory may be a system memory comprising multiple dynamic random access memory (DRAM) units with varying access latencies to the first memory.

Yet another example of the present inventions is an apparatus that includes: an eviction candidate generator to determine a first set of cache line candidates for eviction from a first memory in accordance to a cache line replacement policy, the first set comprising a plurality of cache line candidates; an eviction candidate filter to determine a second set of cache line candidates from the first set of cache line candidates based on respective replacement penalties associated with each cache line candidate in the first set of cache line candidates; and an eviction candidate selector to select a target cache line from the second set of cache line candidates and responsively cause the selected target cache line to be moved from the first memory to a second memory. The cache line replacement policy may be a pseudo least recently used (pLRU) policy. The replacement penalty associated with a given cache line candidate may include an amount of time required to access the given cache line candidate from the second memory. Accessing the given cache line candidate from the second memory may include fetching a copy of the given cache line candidate from the second memory into the first memory. The second set of cache line candidates may include one or more cache line candidates associated with a lowest replacement penalty. The eviction candidate filter may further include: a destination calculator for determining a destination for each of the cache line candidates in the first set; a miss penalty database for determining a replacement penalty for each of the cache line candidates in the first set based on each cache line candidate's determined destination, such that the eviction candidate filter is to select, from the first set, one or more cache line candidates associated with a lowest replacement penalty. The destination calculator may determine the destination for each of the cache line candidates in the first set by executing an address hash on respective cache line addresses of the cache line candidates in the first set. The eviction candidate selector may randomly select the target cache line from the second set of cache line candidates when the second set of cache line candidates comprises more than one cache line candidate. The system may further include a plurality of hardware processor cores, wherein the first memory is a mid-level cache (MLC) of one of the plurality of hardware processor cores and the second memory is a last-level cache (LLC) that is logically shared and physically distributed between the plurality of hardware processor cores. Alternatively, the first memory may be a last-level cache (LLC) and the second memory may be a system memory comprising multiple dynamic random access memory (DRAM) units with varying access latencies to the first memory.

Figure 10:
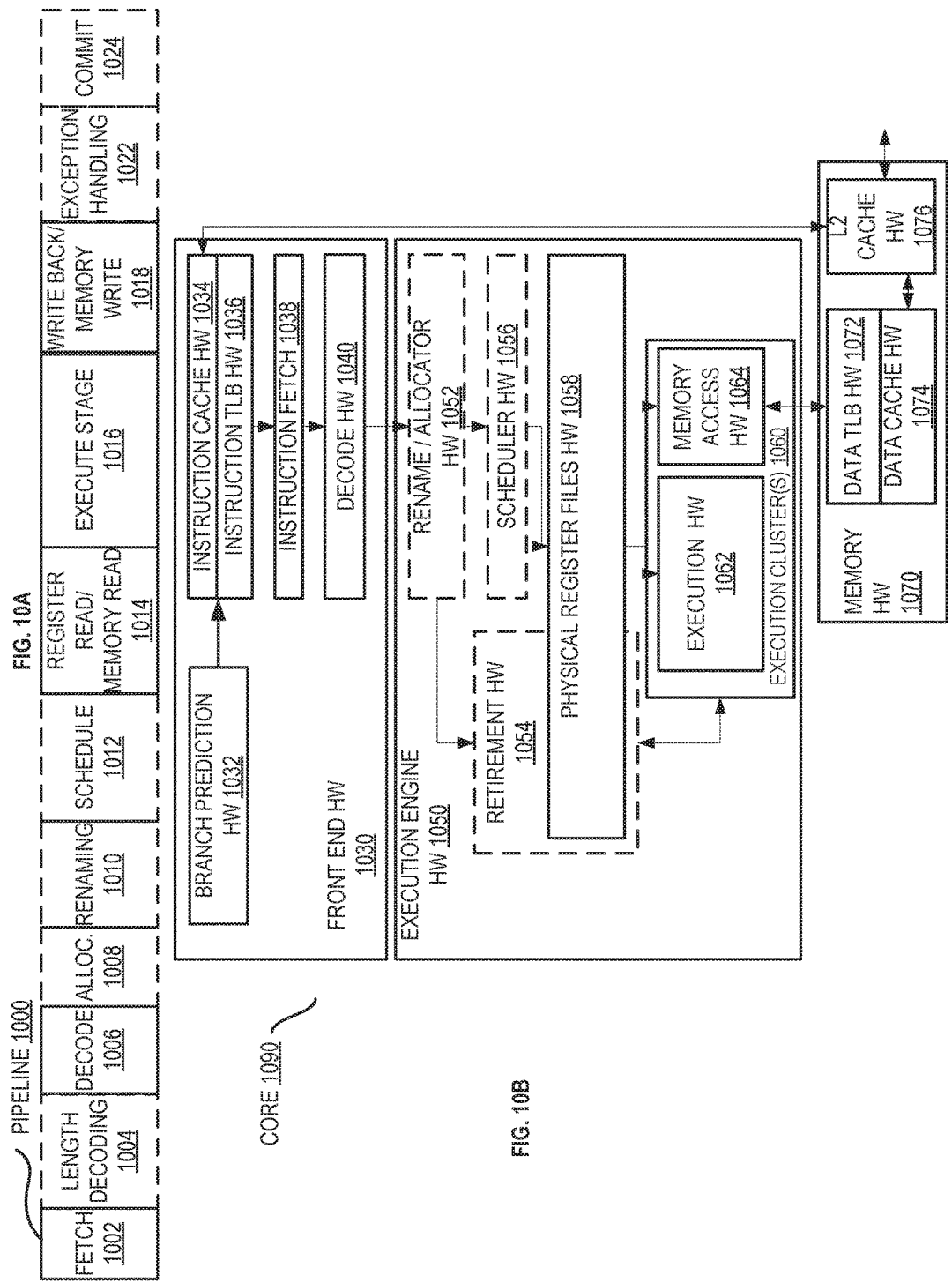
FIG. 10A is a block diagram illustrating both an exemplary in-order pipeline and an exemplary register renaming, out-of-order issue/execution pipeline according to embodiments of the invention.
FIG. 10B is a block diagram illustrating both an exemplary embodiment of an in-order architecture core and an exemplary register renaming, out-of-order issue/execution architecture core to be included in a processor according to embodiments of the invention.

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end hardware 1030 coupled to an execution engine hardware 1050, and both are coupled to a memory hardware 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end hardware 1030 includes a branch prediction hardware 1032 coupled to an instruction cache hardware 1034, which is coupled to an instruction translation lookaside buffer (TLB) 1036, which is coupled to an instruction fetch hardware 1038, which is coupled to a decode hardware 1040. The decode hardware 1040 (or decoder) may decode instructions, and generate as an output one or more microoperations, micro-code entry points, microinstructions, other instructions, or other control signals, which are decoded from, or which otherwise reflect, or are derived from, the original instructions. The decode hardware 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode hardware 1040 or otherwise within the front end hardware 1030). The decode hardware 1040 is coupled to a rename/allocator hardware 1052 in the execution engine hardware 1050.

The execution engine hardware 1050 includes the rename/allocator hardware 1052 coupled to a retirement hardware 1054 and a set of one or more scheduler hardware 1056. The scheduler hardware 1056 represents any number of different schedulers, including reservations stations, central instruction window, etc. The scheduler hardware 1056 is coupled to the physical register file(s) hardware 1058. Each of the physical register file(s) hardware 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1058 comprises a vector registers hardware, a write mask registers hardware, and a scalar registers hardware. This register hardware may provide architectural vector registers, vector mask registers, and general purpose registers. The physical register file(s) hardware 1058 is overlapped by the retirement hardware 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1054 and the physical register file(s) hardware 1058 are coupled to the execution cluster(s) 1060. The execution cluster(s) 1060 includes a set of one or more execution hardware 1062 and a set of one or more memory access hardware 1064. The execution hardware 1062 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1056, physical register file(s) hardware 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1064). It should also be understood that where separate pipelines are used, one or more of these pipelines may be out-of-order issue/execution and the rest in-order.

The set of memory access hardware 1064 is coupled to the memory hardware 1070, which includes a data TLB hardware 1072 coupled to a data cache hardware 1074 coupled to a level 2 (L2) cache hardware 1076. In one exemplary embodiment, the memory access hardware 1064 may include a load hardware, a store address hardware, and a store data hardware, each of which is coupled to the data TLB hardware 1072 in the memory hardware 1070. The instruction cache hardware 1034 is further coupled to a level 2 (L2) cache hardware 1076 in the memory hardware 1070. The L2 cache hardware 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode hardware 1040 performs the decode stage 1006; 3) the rename/allocator hardware 1052 performs the allocation stage 1008 and renaming stage 1010; 4) the scheduler hardware 1056 performs the schedule stage 1012; 5) the physical register file(s) hardware 1058 and the memory hardware 1070 perform the register read/memory read stage 1014; the execution cluster 1060 perform the execute stage 1016; 6) the memory hardware 1070 and the physical register file(s) hardware 1058 perform the write back/memory write stage 1018; 7) various hardware may be involved in the exception handling stage 1022; and 8) the retirement hardware 1054 and the physical register file(s) hardware 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1034/1074 and a shared L2 cache hardware 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
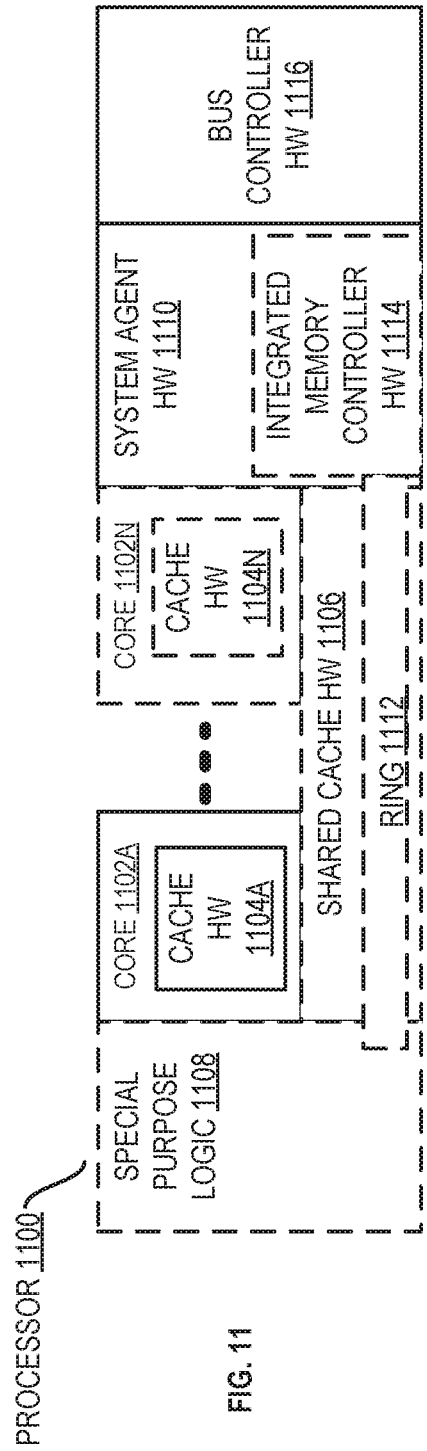
FIG. 11 is a block diagram of a single core processor and a multicore processor with integrated memory controller and graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller hardware 1116, while the optional addition of the dashed lined boxes illustrates an alternative processor 1100 with multiple cores 1102A-N, a set of one or more integrated memory controller hardware 1114 in the system agent hardware 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1106, and external memory (not shown) coupled to the set of integrated memory controller hardware 1114. The set of shared cache hardware 1106 may include one or more mid-level caches, such as level 2 (L2), level 3 (L3), level 4 (L4), or other levels of cache, a last level cache (LLC), and/or combinations thereof. While in one embodiment a ring based interconnect hardware 1112 interconnects the integrated graphics logic 1108, the set of shared cache hardware 1106, and the system agent hardware 1110/integrated memory controller hardware 1114, alternative embodiments may use any number of well-known techniques for interconnecting such hardware. In one embodiment, coherency is maintained between one or more cache hardware 1106 and cores 1102-A-N.

In some embodiments, one or more of the cores 1102A-N are capable of multi-threading. The system agent 1110 includes those components coordinating and operating cores 1102A-N. The system agent hardware 1110 may include for example a power control unit (PCU) and a display hardware. The PCU may be or include logic and components needed for regulating the power state of the cores 1102A-N and the integrated graphics logic 1108. The display hardware is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. In one embodiment, the cores 1102A-N are heterogeneous and include both the "small" cores and "big" cores described below.

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
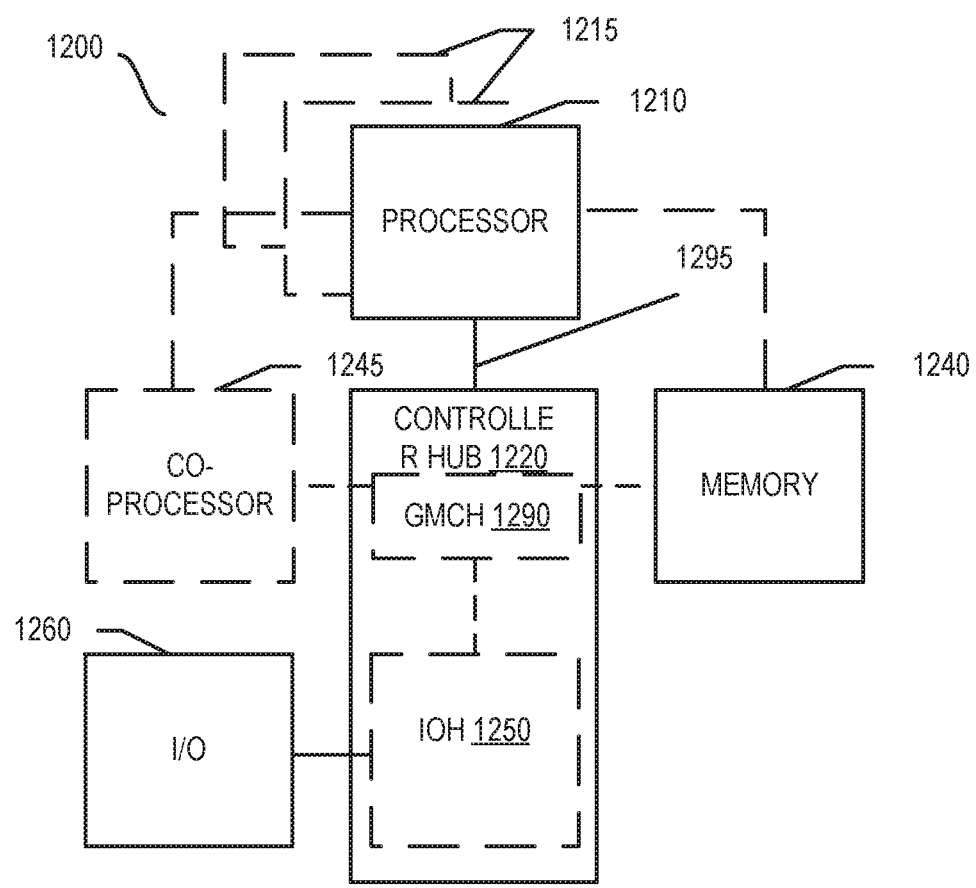
FIG. 12 illustrates a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
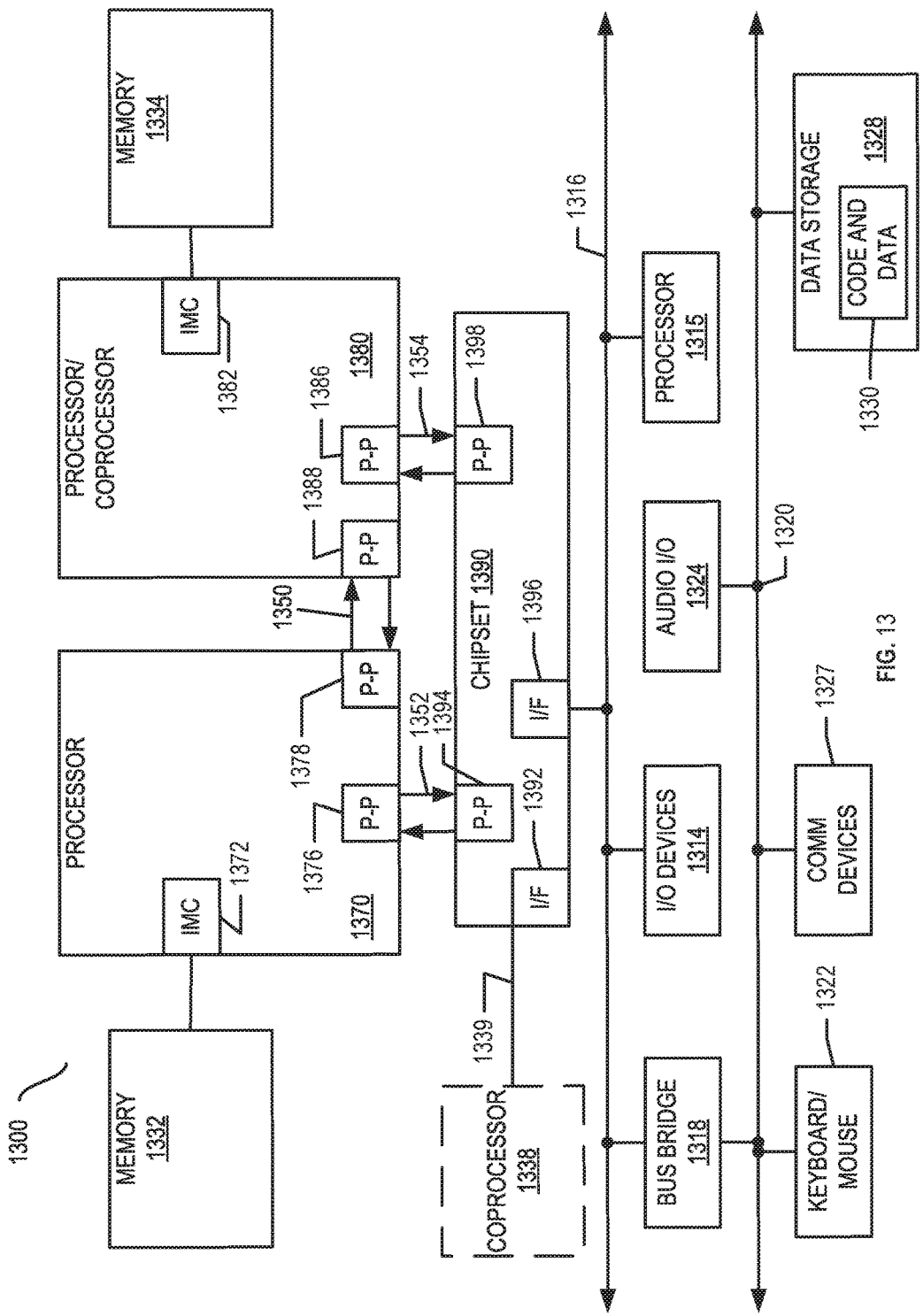
FIG. 13 illustrates a block diagram of a second system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) hardware 1372 and 1382, respectively. Processor 1370 also includes as part of its bus controller hardware point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) hardware), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage hardware 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
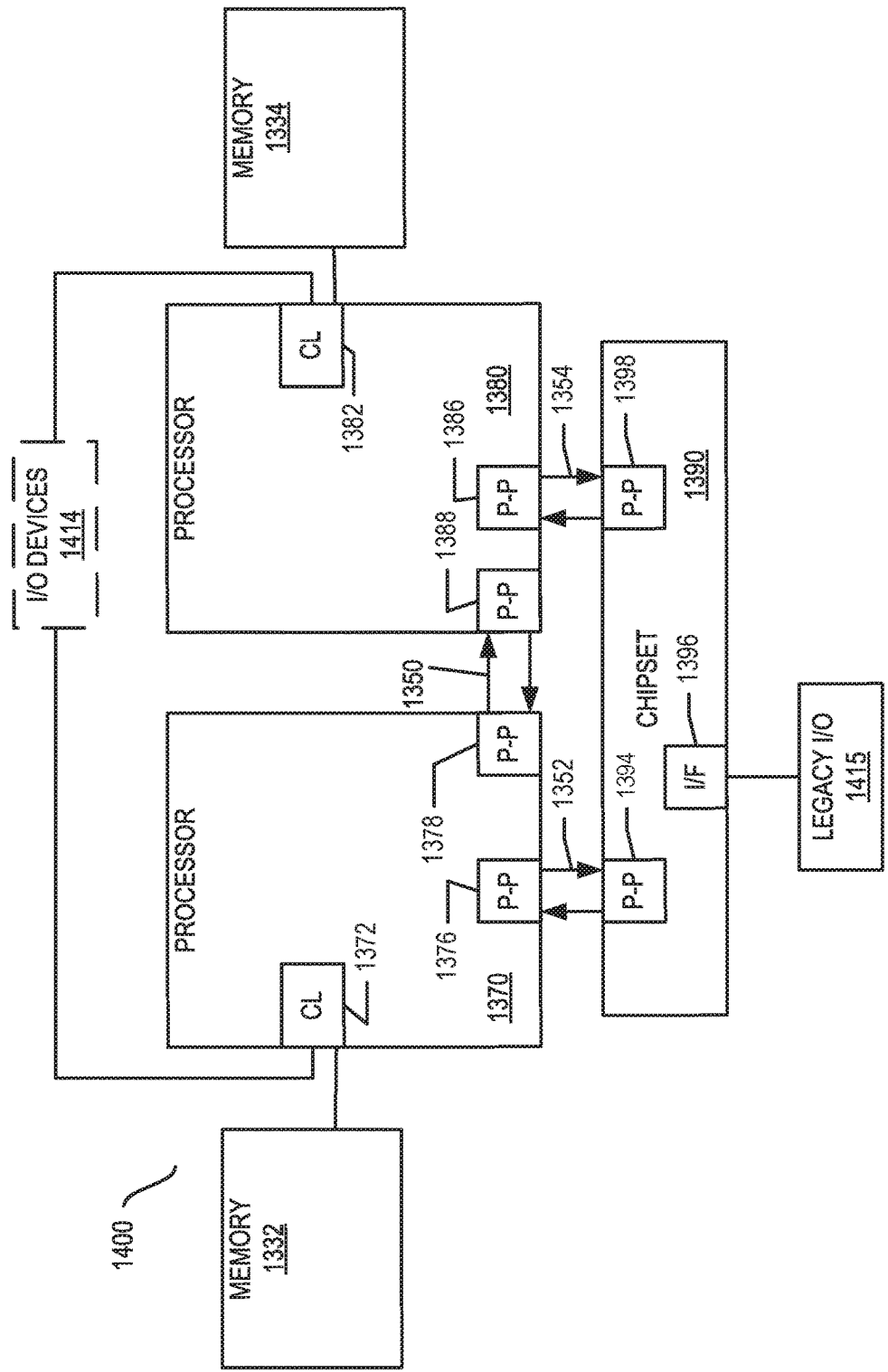
FIG. 14 illustrates a block diagram of a third system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller hardware and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
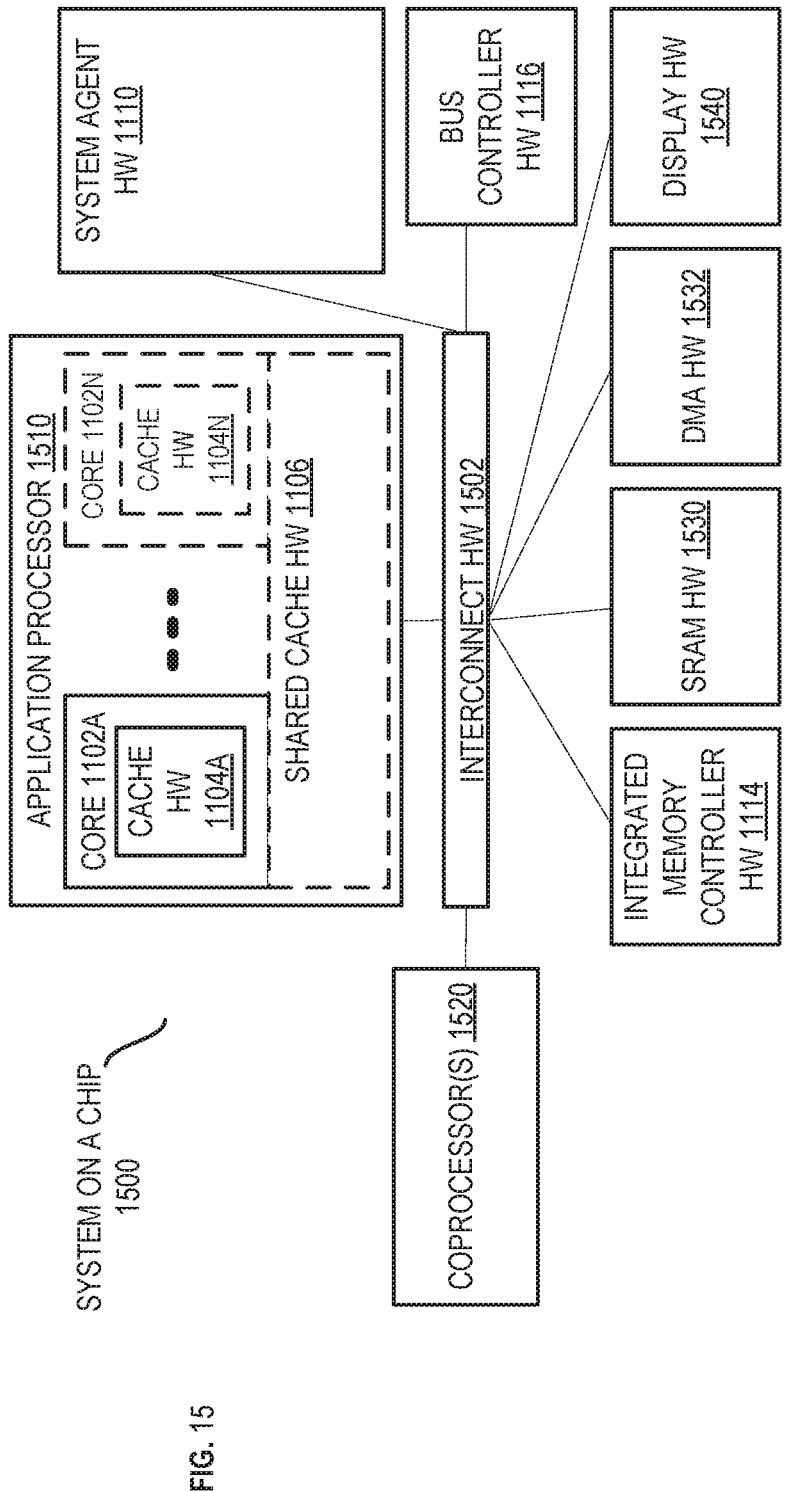
FIG. 15 illustrates a block diagram of a system on a chip (SoC) in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect hardware 1502 is coupled to: an application processor 1510 which includes a set of one or more cores 1102A-N and shared cache hardware 1106; a system agent hardware 1110; a bus controller hardware 1116; an integrated memory controller hardware 1114; a set or one or more coprocessors 1520 which may include integrated graphics logic, an image processor, an audio processor, and a video processor; an static random access memory (SRAM) hardware 1530; a direct memory access (DMA) hardware 1532; and a display hardware 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable' s (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for selecting a cache line for eviction, the method comprising:

determining a first set of cache line candidates for eviction from a first memory in accordance to a cache line replacement policy, the first set comprising a plurality of cache line candidates each associated with a same least recently used age;

determining a second set of cache line candidates from the first set based on replacement penalties associated with each respective cache line candidate in the first set, wherein determining the second set of cache line candidates comprises:

determining a destination for each of the cache line candidates in the first set, the destination determined by performing a hash on address of each of the cache line candidates in the first set;

determining a replacement penalty for each of the cache line candidates in the first set based on each cache line candidate's determined destination; and selecting, from the first set, one or more cache line candidates associated with a lowest replacement penalty to generate the second set of cache line candidates;

selecting a target cache line from the second set of cache line candidates, wherein the target cache line is selected at random when there is more than one cache line candidate in the second set; and responsively causing the selected target cache line to be moved from the first memory to a second memory.

2. The method of claim 1, wherein the cache line replacement policy is a pseudo least recently used (pLRU) policy.

3. The method of claim 1, wherein the replacement penalty associated with a given cache line candidate comprises an amount of time required to access the given cache line candidate from the second memory.

4. The method of claim 3, wherein accessing the given cache line candidate from the second memory comprises fetching a copy of the given cache line candidate from the second memory into the first memory.

5. The method of claim 1, wherein the second set of cache line candidates comprises one or more cache line candidates each associated with a lowest replacement penalty.

6. The method of claim 1, wherein determining the destination for each of the cache line candidates in the first set comprises executing an address hash on respective cache line addresses of the cache line candidates in the first set.

7. The method of claim 1, wherein the target cache line is randomly selected from the second set of cache line candidates when the second set of cache line candidates comprises more than one cache line candidate.

8. The method of claim 1, wherein the first memory is a mid-level cache (MLC) and the second memory is a last-level cache (LLC) that is logically shared and physically distributed between a plurality of hardware processor cores.

9. The method of claim 1, wherein the first memory is a last-level cache (LLC) and the second memory is a system memory comprising multiple dynamic random access memory (DRAM) units with varying access latencies to the first memory.

10. A system comprising:
a first memory for storing a plurality of cache lines;
a second memory communicatively coupled to the first memory;
an eviction candidate generator to determine a first set of cache line candidates for eviction from the first memory in accordance to a cache line replacement policy, the first set comprising a plurality of cache line candidates each associated with a same least recently used age;
an eviction candidate filter to determine a second set of cache line candidates from the first set of cache line candidates based on respective replacement penalties associated with each cache line candidate in the first set of cache line candidates, wherein the eviction candidate filter comprises:
a destination calculator for determining a destination for each of the cache line candidates in the first set, the destination determined by performing a hash on address of each of the cache line candidates in the first set;
a miss penalty database for determining a replacement penalty for each of the cache line candidates in the first set based on each cache line candidate's determined destination; and
wherein the eviction candidate filter is to select, from the first set, one or more cache line candidates associated with a lowest replacement penalty to generate the second set of cache line candidates; and
an eviction candidate selector to select a target cache line from the second set of cache line candidates and responsively cause the selected target cache line to be moved from the first memory to the second memory, wherein the target cache line is selected at random when there is more than one cache line candidate in the second set.

11. The system of claim 10, wherein the cache line replacement policy is a pseudo least recently used (pLRU) policy.

12. The system of claim 10, wherein the replacement penalty associated with a given cache line candidate comprises an amount of time required to access the given cache line candidate from the second memory.

13. The system of claim 12, wherein accessing the given cache line candidate from the second memory comprises fetching a copy of the given cache line candidate from the second memory into the first memory.

14. The system of claim 10, wherein the second set of cache line candidates comprises one or more cache line candidates associated with a lowest replacement penalty.

15. The system of claim 10, wherein the destination calculator is to determine the destination for each of the cache line candidates in the first set by executing an address hash on respective cache line addresses of the cache line candidates in the first set.

16. The system of claim 10, wherein the eviction candidate selector is to randomly select the target cache line from the second set of cache line candidates when the second set of cache line candidates comprises more than one cache line candidate.

17. The system of claim 10 further comprising a plurality of hardware processor cores, wherein the first memory is a mid-level cache (MLC) of one of the plurality of hardware processor cores and the second memory is a last-level cache (LLC) that is logically shared and physically distributed between the plurality of hardware processor cores.

18. The system of claim 10, wherein the first memory is a last-level cache (LLC) and the second memory is a system memory comprising multiple dynamic random access memory (DRAM) units with varying access latencies to the first memory.

19. An apparatus comprising:
an eviction candidate generator to determine a first set of cache line candidates for eviction from a first memory in accordance to a cache line replacement policy, the first set comprising a plurality of cache line candidates each associated with a same least recently used age;
an eviction candidate filter to determine a second set of cache line candidates from the first set of cache line candidates based on respective replacement penalties associated with each cache line candidate in the first set of cache line candidates, wherein the eviction candidate filter comprises:
- a destination calculator for determining a destination for each of the cache line candidates in the first set, the destination determined by performing a hash on address of each of the cache line candidates in the first set;
- a miss penalty database for determining a replacement penalty for each of the cache line candidates in the first set based on each cache line candidate's determined destination; and
- wherein the eviction candidate filter is to select, from the first set, one or more cache line candidates associated with a lowest replacement penalty to generate the second set of cache line candidates; and an eviction candidate selector to select a target cache line from the second set of cache line candidates and responsively cause the selected target cache line to be moved from the first memory to a second memory, wherein the target cache line is selected at random when there is more than one cache line candidate in the second set.

20. The apparatus of claim 19, wherein the cache line replacement policy is a pseudo least recently used (pLRU) policy.

21. The apparatus of claim 19, wherein the replacement penalty associated with a given cache line candidate comprises an amount of time required to access the given cache line candidate from the second memory.

22. The apparatus of claim 21, wherein accessing the given cache line candidate from the second memory comprises fetching a copy of the given cache line candidate from the second memory into the first memory.

23. The apparatus of claim 19, wherein the second set of cache line candidates comprises one or more cache line candidates associated with a lowest replacement penalty.

* * * * *